(12) United States Patent
Domnick et al.

(10) Patent No.: US 11,965,825 B2
(45) Date of Patent: Apr. 23, 2024

(54) IN-LINE COMPACT MEASURING DEVICE

(71) Applicant: Endress+Hauser Conducta GmbH+Co. KG, Gerlingen (DE)

(72) Inventors: Hongshuo Domnick, Dresden (DE); Christian Cramer, Stuttgart (DE); Michael Wiederkehr, Leonberg (DE); Moritz Klein, Aalen (DE); Joachim Mannhardt, Aalen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 11 days.

(21) Appl. No.: 17/389,485

(22) Filed: Jul. 30, 2021

(65) Prior Publication Data

US 2022/0042906 A1 Feb. 10, 2022

(30) Foreign Application Priority Data

Aug. 4, 2020 (DE) ............... 10 2020 120 593.7

(51) Int. Cl.
*G01N 21/33* (2006.01)
*G01J 1/02* (2006.01)
*G01J 3/02* (2006.01)
*G01N 21/03* (2006.01)

(52) U.S. Cl.
CPC ......... *G01N 21/33* (2013.01); *G01J 1/0252* (2013.01); *G01J 1/0271* (2013.01); *G01J 3/0286* (2013.01); *G01J 3/0291* (2013.01); *G01N 21/0303* (2013.01); *G01N 21/0332* (2013.01); *G01N 2021/0389* (2013.01)

(58) Field of Classification Search
CPC ...... G01J 1/0252; G01J 1/0271; G01J 3/0286; G01J 3/0291
See application file for complete search history.

(56) References Cited

U.S. PATENT DOCUMENTS

| | | | |
|---|---|---|---|
| 9,234,693 B2 * | 1/2016 | Toft | G01J 3/0286 |
| 10,222,261 B2 * | 3/2019 | Osawa | G01N 21/274 |
| 10,429,307 B2 * | 10/2019 | Jagiella | G01J 3/108 |
| 10,705,044 B2 * | 7/2020 | Hanko | C12Y 101/03004 |
| 2013/0302209 A1 | 11/2013 | Owen et al. | |
| 2017/0010214 A1 * | 1/2017 | Osawa | G01J 3/0286 |
| 2020/0225146 A1 | 7/2020 | Matsuo | |

FOREIGN PATENT DOCUMENTS

| DE | 102004018534 A1 | 11/2005 |
|---|---|---|
| DE | 102015122995 A1 | 7/2017 |

* cited by examiner

*Primary Examiner* — Rebecca C Bryant
(74) *Attorney, Agent, or Firm* — Mark A. Logan; Endress+Hauser (USA) Holding, Inc.

(57) ABSTRACT

The present disclosure relates to an in-line compact measuring device, for example for optical measurements, comprising a housing having a process connection intended to be connected to a process vessel connection complementary to the process connection; at least one sensor assembly arranged in the housing; and a measuring circuit that is connected to the sensor assembly and is arranged in the housing. The in-line compact measuring device has at least one fluid line in thermally conductive contact with at least one housing wall of the housing, which fluid line can be connected to a cooling fluid supply arranged outside the housing.

7 Claims, 1 Drawing Sheet

IN-LINE COMPACT MEASURING DEVICE

CROSS-REFERENCE TO RELATED APPLICATION

The present application is related to and claims the priority benefit of German Patent Application No. 10 2020 120 593.7, filed on Aug. 4, 2020, the entire contents of which are incorporated herein by reference.

TECHNICAL FIELD

The present disclosure relates to an in-line compact measuring device that can, for example, be set up for optical measurements. The in-line compact measuring device can, for example, comprise an in-line spectrometer.

BACKGROUND

In process measuring technology, measuring devices are used, among other things, to determine properties of process media and to use the acquired measurement data to monitor, control and/or regulate processes. Measuring devices can have a probe that is integrated into a process and that generates raw measurement signals and outputs them to remote electronics for further processing and evaluation. However, there are also compact measuring devices, for example, "smart" sensors, which have a single housing in which the sensor components used to generate raw measurement signals are bundled with an electronic evaluation unit for further processing of the raw measurement signals. The housing of such compact measuring devices can, by means of a process connection, be integrated into a wall of a process vessel, for example, a pipe conveying gas or liquid, a reactor, a fermenter or a storage vessel.

Optical measuring devices are, for example, used for a variety of measuring tasks, for example, for the qualitative or quantitative determination of one or more analytes, for the determination of a sum parameter, or for the determination of a particle load and/or turbidity in a process medium. The process medium can, for example, be a gas or a liquid. Optical measuring devices are configured to radiate measuring radiation into the process medium, to receive at least a portion of the radiation changed after interaction with the process medium and on the basis of the received radiation to generate a measuring signal that represents the property or measurand to be determined. Depending on the application, the changed radiation can be radiation that is transmitted, reflected, emitted and/or scattered by luminescence of a component of the process medium.

Optical measuring devices used in process measuring technology are, for example, scattered-light sensors, such as, for example, turbidity sensors, photometers, spectrometers and/or spectrophotometers. The measuring devices often have a housing with a process connection that can be attached to a process vessel, in order to integrate the measuring device into the process vessel for in-process measurements. Such integrated measuring devices are also referred to as in-line measuring devices. One or more measurement windows that face the interior of the process vessel may be integrated into the housing of an optical measuring device, if the housing is connected to the process vessel. Via the measurement window or windows, the measuring device can radiate measuring radiation into the process vessel and receive the transformed radiation from the process vessel. Optical measuring devices further comprise optical components, namely one or more radiation sources for the measuring radiation and one or more detectors, which are configured to receive the transformed radiation and to generate measurement signals and/or measurement data dependent on the radiation received. Possible detectors are, for example, photodiodes, photodiode arrays or a spectrometer. Optical measuring devices also have a measuring circuit, for example in the form of a measuring electronics unit, to generate and possibly further process measurement signals or measurement data. The measuring circuit can be used to control the radiation source or radiation sources and to process the measuring signals or measuring data generated by the detectors. The measuring circuit can also be set up to determine, on the basis of the measurement signals, measured values of the measurand to be determined and to output them via an interface to a higher-level unit, for example, a process control unit, a measuring transducer, an operating unit or another data processing unit.

Optical in-line measuring devices can have a probe and a housing remote therefrom. In this case, the probe can have the aforementioned process connection and means for in-coupling measuring radiation into a process medium and for out-coupling changed radiation from the process medium, for example, the aforementioned measurement windows. In some optical measuring devices, especially in turbidity measuring devices or photometric measuring devices, the optical components may be arranged at least partially in the probe. Optionally, the probe can also contain parts of the measuring circuit. In these cases, the remote housing can contain at least parts of the measuring circuit that is used for further processing of signals of the circuitry integrated in the probe. In these cases, the probe is connected to the circuitry arranged in the remote housing via a cable for the transmission of analog or digital measurement signals.

In other optical measuring devices, especially in spectrometers, all of the optical components and measuring circuitry are often arranged in the remote housing. In this case, the probe is connected via light guides to the optical components in the remote housing, which guide the measuring radiation from the radiation source arranged in the housing to the probe in order to couple it into the process medium, and guide the converted radiation coupled into the probe back into the detector arranged in the remote housing.

There are now also optical compact measuring devices characterized by having the measurement windows, optical components and the measuring circuit arranged together in a single housing—which can be attached to a process vessel via a process connection—in such a way that the means for in-coupling and out-coupling radiation, for example, measurement windows, face the interior of the process vessel in order to in-couple and out-couple radiation.

Optical, in particular spectrometric, in-line compact measuring devices can in principle be used very universally, since, on the basis of suitable chemometric models, a plurality of measurands, for example the concentration of a very wide variety of analytes, can be determined using spectrometric data or spectrophotometric data. However, particularly in the case of spectrometers, the relatively complex optical system and electronic system of such measuring devices is temperature-sensitive, such that a structure like that described above with a probe and a housing remote therefrom, in which the optical components and the sensor circuit are accommodated, has so far been preferred for such optical measuring devices.

SUMMARY

It is therefore the object of the present disclosure to provide an in-line compact measuring device that can also be used for measurements at elevated temperatures.

This object is achieved according to the present disclosure by the method according to claim 1. Advantageous embodiments are listed in the dependent claims.

The in-line compact measuring device according to the present disclosure comprises:

a housing, for example, of multi-part design, which has a process connection, wherein the process connection is intended to be connected to a connection of a process vessel that is complementary to the process connection;

at least one sensor assembly arranged in the housing; and a measuring circuit connected to the sensor assembly and arranged in the housing, wherein the in-line compact measuring device has at least one fluid line in thermally conductive contact with at least one housing wall of the housing, which fluid line can be connected to a cooling fluid supply arranged outside the housing.

During operation of the compact measuring device, a cooling fluid, for example a gas or a liquid, such as water, can flow through the fluid line and thus cool the housing, in order to protect temperature-sensitive components, in particular the sensor assembly and/or the measuring circuit. The fluid line can be integrated into the housing.

The sensor assembly is used for acquiring primary measurement signals. It can, for example, form a measuring sensor for optical or electrochemical measurements. It can also have a temperature sensor. The compact measuring device can, for example, be suitable for optical measurements and will then accordingly have a sensor assembly with optical components, for example, at least one radiation source and at least one radiation receiver or detector. These can be connected to the measuring circuit. The measuring circuit can be configured to control the radiation source to emit measuring radiation. It can further be configured to receive, register, optionally amplify and forward and/or process measurement signals of the radiation receiver. The radiation receiver can be configured to receive radiation emitted by the radiation source and changed within a measuring medium and to generate signals dependent on one or more properties of the changed radiation.

The radiation source can comprise one or more LEDs or a broadband light source, for example, a UV lamp. The radiation receiver can be a detector comprising one or more photodiodes or a photodiode array. The detector can also be a spectrometer.

In one possible development, the in-line compact measuring device can have means for in-coupling radiation from the housing into a measuring medium contained in the process vessel and/or means for in-coupling radiation from the measuring medium into the housing. The in-line compact measuring device can thus have, for example, at least one measurement window that is integrated into a wall of the housing. The at least one measurement window can serve to in-couple and out-couple radiation from the radiation source out of the housing or into the housing to the radiation detector. Alternatively, fibers routed through the housing wall or other means for in-coupling and out-coupling radiation can also be used for this purpose.

In an advantageous development, the fluid line is designed as a fluid channel integrated in the housing. The housing can be made of a steel.

In the housing, an electronics compartment can be formed, which extends from a first end of the housing in the direction of the process connection, and in which the measuring circuit is arranged, wherein the fluid line is arranged outside the electronics compartment on a side of the electronics compartment facing away from the first end of the housing.

The fluid line, in particular the fluid channel, can be arranged between the electronics compartment and a region of the in-line compact measuring device that is intended to come into contact with a measuring medium contained in the process vessel, if the process connection of the in-line compact measuring device is connected to the process vessel. For example, a flow direction along which a fluid flows through the fluid line, for example the aforementioned fluid channel, can run in a plane extending between the electronics compartment and the process connection.

In one development, the measuring circuit can be arranged on a circuit board arranged in the electronics compartment. The measuring circuit can be used to operate the measuring device and to determine measured values. The sensor assembly can also be arranged in the electronics compartment. If the in-line compact measuring device is designed as an optical measuring device, the optical components of the sensor assembly can be arranged in the electronics compartment, for example, on a carrier.

For explosion protection and/or protection against penetrating moisture or water, the electronics compartment can be sealed tightly against the environment, so that no substance transportation, for example no gas or liquid transportation can take place between the electronics compartment and the environment, or at least such a substance transportation taking place between the electronics compartment and the environment is so small that it is not sufficient to dissipate heat from the electronics compartment, in particular from the measuring circuit and/or the sensor assembly, to a sufficient extent to protect temperature-sensitive parts of the sensor assembly and/or of the measuring circuit.

The electronics compartment can have an essentially cylindrical side wall, wherein at least one cooling plate is arranged within the electronics compartment, which cooling plate essentially runs along the side wall of the electronics compartment and is in thermally conductive contact with the fluid line. The cooling plate can be bent into a hollow cylindrical shape and at least partially surround the sensor assembly, for example a carrier to which at least a part of the sensor assembly is attached. Optionally, the cooling plate can additionally at least partially surround a circuit board having at least parts of the measuring circuit.

The cooling plate can be formed from a metal, for example copper, silver, gold or aluminum. Alternatively, instead of the cooling plate, a heat pipe can be used to cool the electronics compartment.

A carrier can be arranged in the electronics compartment, to which carrier the at least one part of the measuring circuit and at least parts of the sensor assembly, for example the optical components of the measuring device mentioned above, are attached. If the measuring instrument has at least one radiation source and one detector, these can be attached to the carrier. As already mentioned, the detector can be a spectrometer. Radiation can be conducted from the radiation source by means of optical fibers to a means for in-coupling and/or out-coupling radiation, for example a measurement window. Radiation that has changed in a measuring medium outside the housing can be coupled back into the housing via the means for in-coupling and/or out-coupling radiation, for example the measurement window, and can be conducted to the detector by means of optical fibers.

In one possible development, the sensor assembly can have at least one radiation source, wherein the radiation source is attached to an additional cooling plate that is in thermally conductive contact with the fluid line. The additional cooling plate with the radiation source can be at least partially surrounded by the aforementioned cooling plate, which is bent, for example, in a hollow cylindrical shape.

BRIEF DESCRIPTION OF THE DRAWINGS

In the following, the present disclosure is described in more detail using the exemplary embodiments shown in the figures. The following are shown.

DETAILED DESCRIPTION

Figure 1:
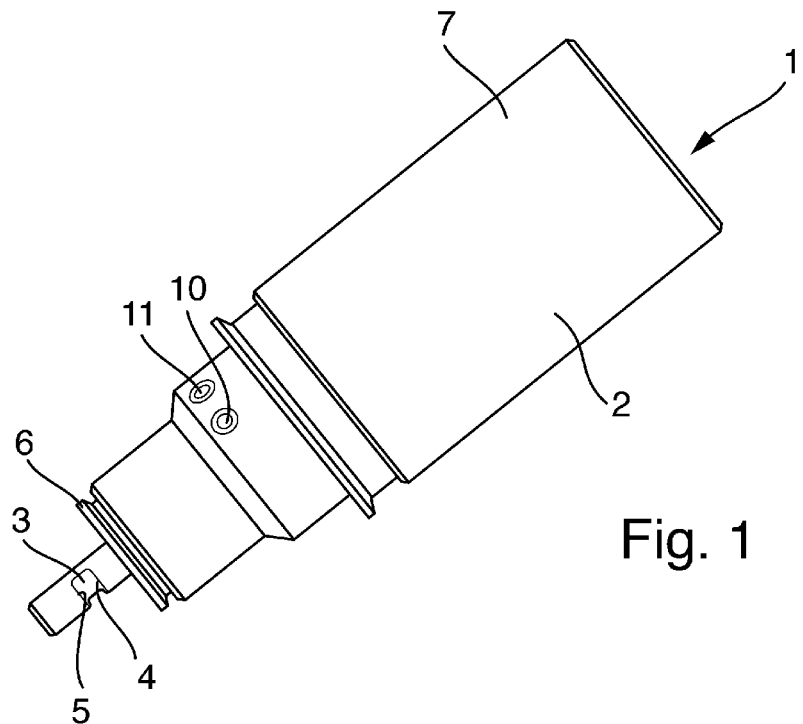
FIG. 1 shows a schematic representation of an optical in-line compact measuring device.

FIG. 1 shows an optical in-line compact measuring device 1, which in the present example has a spectrometer. The in-line compact measuring device 1 is also shown in longitudinal section in FIG. 2. Identical reference signs in the two figures denote identical components of the in-line compact measuring device 1. The in-line compact measuring device 1 has a housing 2 made of steel, which in the present example is designed to be essentially cylinder-symmetrical with an imaginary central cylinder symmetry axis Z. The housing 2 can be formed from a plurality of individual parts.

The front end of the housing 2 is provided for contact with a process medium. This region is also referred to below as a medium-contacting region. A cuvette 3 for transmission measurements is formed in this region. The cuvette 3 has a first measurement window 4 through which measuring radiation can exit the housing 2, and an opposite second measurement window 5 through which the radiation changed by interaction with the process medium can enter the housing 2.

The housing 2 has a process connection 6 which can be attached to a complementary connection of a process vessel, such as a reactor, a fermenter or a pipe. The region of the housing 2 that is arranged on the side of the process connection 6 facing away from the cuvette 3 does not come into direct contact with the process medium. However, via the housing wall it is in thermally conductive contact with the medium-contacting region of the housing 2.

At its rear end, the housing 2 encloses an electronics compartment 7, which extends from the rear end of the housing 2 facing away from the process in the direction of the process connection 6. The electronics compartment 7 contains a measuring circuit in the form of a measuring electronics unit that is shown symbolically in FIG. 2 in the form of a circuit board 8. In addition, the electronics compartment 7 contains optical components of the measuring device, in the present example a radiation source, which emits radiation in the UV/Vis range of the electromagnetic spectrum, and a UV/Vis spectrometer. The radiation can be conducted from the radiation source within the housing 2 to the first measurement window 4 by means of optical fibers. Converted radiation coupled back into the housing 2 via the second measurement window 5 can be guided within the housing 2 to the spectrometer via optical fibers. The measuring electronics unit is designed to control the radiation source and the spectrometer for the acquisition of absorption spectra of a process medium present in the cuvette 3, and to further process the captured spectral data by means of the spectrometer and/or to output such data to a higher-level unit connected to the in-line compact measuring device 1. The spectrometer and the measuring circuit can be attached to a carrier that is arranged within the electronics compartment 7 (not shown in the figures).

If the process medium contacting the medium-contacting region of the housing 2 has a high temperature, due to the compact design of the in-line compact measuring device 1, not only will heating of the region of the housing 2 in contact with the medium occur, but also, via the thermal conduction of the housing 2 that is made of steel, it will also be possible for the region of the housing 2 arranged above the process connection 6 to be heated. This endangers temperature-sensitive optical components and temperature-sensitive circuit elements of the measuring circuit.

A fluid channel 9, which can be connected to a cooling fluid supply arranged outside the housing 2, is therefore formed in the housing 2 in a region between the electronics compartment 7 and the process connection 6, and thus also between the electronics compartment 7 and the medium-contacting region of the in-line compact measuring device 1. For this purpose, the fluid channel 9 has an inlet opening 10 and an outlet opening 11. The cooling fluid can be water, for example. In the example shown here, the fluid channel 9 has a rectangular cross-section and extends annularly about the (imaginary) axis Z of the housing 2. The fluid channel 9 also runs in an (imaginary) plane extending perpendicularly to the axis Z between the medium-contacting region and the electronics compartment 7.

If, for example, water is conducted as a cooling medium through the fluid channel 9, even for high process temperatures the temperature inside the electronics compartment 7 will remain below a threshold value critical to the temperature-sensitive components of the measuring circuit and/or of the optical components.

Figure 2:
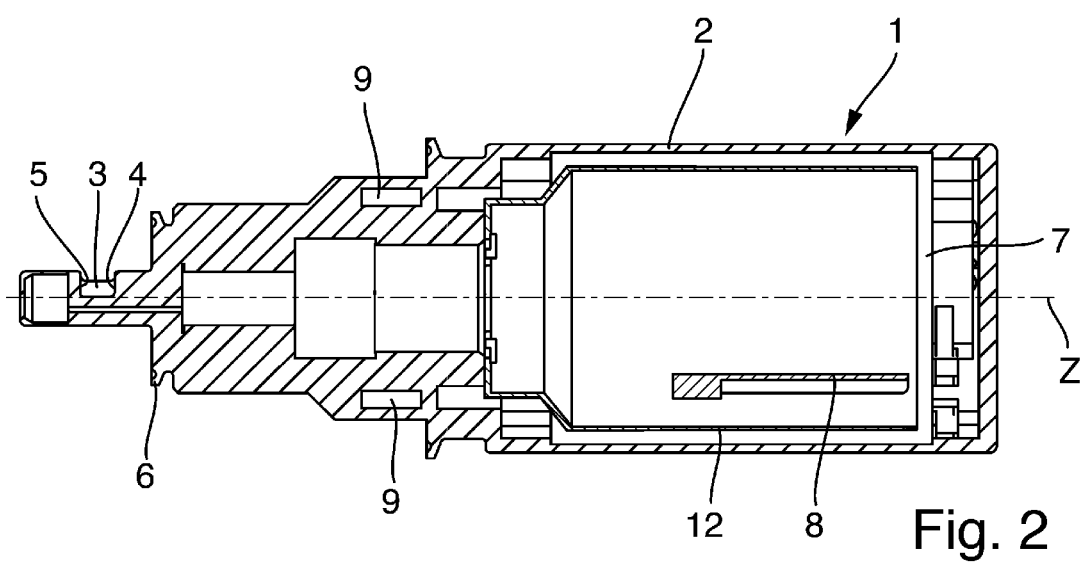
FIG. 2 shows a schematic representation of a longitudinal section through the in-line compact measuring device shown in FIG. 1.

In the particularly advantageous development shown here of the in-line compact measuring device 1, as shown in FIG. 2, a cooling plate 12, which serves to dissipate heat from the electronics compartment 7, is present within the housing 2 as a further measure in addition to the fluid channel 9. In the exemplary embodiment shown here, this cooling plate 12 is made of copper. It is essentially bent into a hollow-cylindrical shape and arranged concentrically with respect to the common axis Z to the housing wall of the electronics compartment 7 formed in the housing 2. The cooling plate 12 is screwed onto a housing shoulder above the fluid channel 9. It is thus in thermally conductive contact with the fluid channel 9.

In the present example, the cooling plate 12 is designed to be bent into a closed or nearly closed hollow cylinder around the axis Z. In principle, it is also possible for the cooling plate 12 not to be bent into a complete hollow cylinder, but to be bent around the axis Z only in an arcuate manner and to thus form a cylinder segment that covers, for example, only a portion, for example a third or half, of the periphery of the electronics compartment. In this development as well, it is advantageous if the cooling plate 12 extends over the entire length of the electronics compartment 7 and is in thermally conductive contact with the fluid channel 9.

However, it is particularly advantageous if the cooling plate 12 has as large an area as possible. In order to protect from ambient heat the measuring electronics accommodated in the electronics compartment 7, a closed hollow-cylindrical cooling plate 12 is preferred.

The use of the cooling plate 12 is advantageous at high process temperatures and/or ambient temperatures, in order to sufficiently dissipate heat from the tightly sealed electronics compartment so that the measuring electronics and/or the optical components are not damaged. As simulations and measurements have shown, without the cooling plate 12 warm air can rise upwards within the electronics compartment 7 and remain there, while cold air accumulates further below in the region of the fluid channel 9. In order to protect against ingress of water or to protect against explosion, the housing 2 surrounding the electronics compartment 7 can be closed off so tightly that no exchange of substances with the environment can occur that alone suffices to cool the components arranged in the electronics compartment 7.

On the one hand, the wall of the housing 2 heated by the thermal contact with the process-contacting region of the housing 2 and by ambient heat is insulated from the interior of the electronics compartment 7 by means of the cooling plate 12. On the other hand, the heat generated in the electronics compartment 7 is effectively dissipated to the fluid channel 9. As a result of insulation by means of the cooling plate 12, the temperature within the electronics compartment remains low. It can thus be seen that by using the cooling plate 12, operation of the in-line compact measuring device 1 is possible at high ambient temperatures, for example up to 60° C., despite sensitive components.

As an additional measure for dissipating heat from the electronics compartment 7, the radiation source arranged in the electronics compartment 7 can be attached to an additional cooling plate (not shown in the figures). This cooling plate can, for example, be made of copper and can be thermally conductively connected to the fluid channel 9 via the housing 2. In this way, heat generated by the radiation source can be dissipated. The additional cooling plate can, for example, be screwed onto the housing 2 in the region of the fluid channel 9.

The present disclosure has been described here for a spectrometer measuring device designed as an in-line compact measuring device for absorption measurements in the UV/Vis spectral range. However, the present disclosure can equally also be used quite analogously for other optical in-line measuring devices that can be used for measuring NIR or MIR spectra, for Raman spectroscopy, as photometers or as turbidity sensors. The present disclosure can also be advantageously applicable for in-line measuring devices that do not work on the basis of an optical measuring principle and that have a temperature-sensitive measuring circuit integrated with the measuring sensor in a housing.

The invention claimed is:

1. An in-line compact measuring device, comprising:
    a housing having:
        a front end and a rear end, wherein the housing is embodied cylindrically about an imaginary Z-axis extending from the front end to the rear end;
        a process connection disposed toward the front end and embodied to attach the in-line compact measuring device to a complementary process connection; and
        an electronics compartment disposed at the rear end and extending from the rear end toward the process connection, wherein the electronics compartment has a cylindrical side wall;
    a sensor assembly arranged in the housing;
    a measuring circuit connected to the sensor assembly and arranged in the electronics compartment of the housing;
    a cylindrical metal cooling plate disposed within the electronics compartment about the imaginary Z-axis and running along the side wall of the electronics compartment; and
    a fluid channel integrated into a wall of the housing and arranged between the process connection and the electronics compartment, wherein the fluid channel includes an inlet opening and an outlet opening in the wall of the housing enabling the fluid channel to be connected to a cooling fluid supply arranged outside the housing.

2. The in-line compact measuring device according to claim 1,
    wherein the sensor assembly includes a radiation source arranged in the housing and a radiation receiver arranged in the housing, and
    wherein the radiation source and the radiation receiver are connected to the measuring circuit.

3. The in-line compact measuring device according to claim 2, further comprising:
    at least one measurement window integrated in a wall of the housing.

4. The in-line compact measuring device according to claim 1,
    wherein the electronics compartment is sealed tightly against the environment.

5. The in-line compact measuring device according to claim 1,
    wherein the cooling plate is formed from copper, silver, gold, or aluminum.

6. The in-line compact measuring device according to claim 1,
    wherein the cooling plate is in thermally conductive contact with the fluid channel.

7. The in-line compact measuring device according to claim 1, wherein the fluid channel runs annularly about the imaginary Z-axis of the housing.

\* \* \* \* \*